United States Patent [19]

Kiefer

[11] Patent Number: 4,472,098

[45] Date of Patent: Sep. 18, 1984

[54] TORQUE LIMITING ELASTOMERIC FASTENER FOR SCREW THREADED MEMBER

[75] Inventor: Henry Kiefer, Troy, Mich.

[73] Assignee: Farathane, Inc., Warren, Mich.

[21] Appl. No.: 245,573

[22] Filed: Mar. 20, 1981

[51] Int. Cl.³ .............................................. F16B 37/14
[52] U.S. Cl. .................................. 411/369; 29/526 R; 36/134; 411/392; 411/411; 411/429; 411/435; 411/907
[58] Field of Search ................... 411/8, 6, 9, 11, 301, 411/310, 309, 308, 324, 34, 182, 222, 429, 247, 435, 436, 392, 398, 508, 907, 908; 29/526 R; 36/134

[56] References Cited

U.S. PATENT DOCUMENTS

| | | | |
|---|---|---|---|
| 3,030,997 | 4/1962 | Collins | 411/301 |
| 3,273,441 | 9/1966 | Biesecker | 411/429 |
| 4,114,506 | 9/1978 | Aimar | 411/435 |

FOREIGN PATENT DOCUMENTS

| | | | |
|---|---|---|---|
| 2307678 | 8/1974 | Fed. Rep. of Germany | 36/134 |
| 1438062 | 3/1966 | France | 411/908 |
| 797380 | 7/1958 | United Kingdom | 411/908 |

*Primary Examiner*—Thomas J. Holko
*Assistant Examiner*—Neill Wilson
*Attorney, Agent, or Firm*—Neal A. Waldrop; Jay C. Taylor

[57] ABSTRACT

Torque limiting clamping means comprises a cylindrical unthreaded screw-thread engaging clamping member of elastomeric material screwed on a rigid screw threaded member at an interference fit. The interference fit, the pitch and dimensions of the screw thread, and the physical characteristics of the elastomeric material are preselected to enable deformation of the elastomeric material resiliently within its elastic limit into the thread groove of the rigid member to accommodate the interference fit and to cause screw induced relative axial movement of the members to a limit of axial travel, whereupon the elastomeric material flows axially across the screw thread to terminate the axial travel and to effect a resilient reaction against the screw thread which results in an axial clamping force and a radial thread-locking force against the thread predetermined by the maximum allowable torque. Upon unscrewing of the members from each other, the elastomeric material returns essentially to its initial undeformed condition for reuse.

15 Claims, 10 Drawing Figures

TORQUE LIMITING ELASTOMERIC FASTENER FOR SCREW THREADED MEMBER

BACKGROUND AND OBJECTS OF THE INVENTION

This application relates to unthreaded elastomeric fasteners adapted to be secured to a relatively rigid screw threaded member and in one embodiment comprises a protective cap of the type adapted to be screwed on an exposed screw shank or threaded stud extending through a screw hole in a panel, thereby to secure the shank in place and where desired, to provide a fluid seal with the panel around the screw hole and also to protect the hands of personnel against injury from sharp portions of the stud or shank.

In some applications, the screw-threaded stud comprises a headless shank having a portion molded within a plastic element adapted to be secured to the panel by the cap screwed on a remaining portion of the shank extending through a hole in the panel. The screw-on torque and final binding or thread lock between the cap and shank must be sufficient to assure retention of the cap and to prevent its unplanned loosening and removal from the shank, yet obviously must not be so large that the shank is pulled loose from its mounting within the element when the cap is tightened to its final condition, nor so large that the screw-off torque will cause the shank to damage its mounting or to be unscrewed therefrom, especially in the event the mounting merely comprises a molded plastic element having one end of a headless shank frictionally retained or bonded therein.

One of the problems involved in the clamping of two members together by screw-threaded means has been to obtain a predetermined clamp load on the basis of various controllables such as the screw-on torque, the size of the bolt hole, the diameter of the fastener, the grade and pitch of the screw thread, etc. In actual practice, however, uncontrolled variables creep in, such as small dimensional variations between the bolts, burrs and poorly formed or galled screw threads, frictional variations, cross-threading, and the substitution of metric fasteners for approximately comparable U.S. fasteners, all of which conspire to effect an actual clamping force sometimes much different from the desired force, even when the screwing torque is carefully controlled.

Important objects of the invention are to provide an improved cap of the foregoing type, or cover for an exposed screw shank, and a method for using such a cap, wherein a particularly compact, simple and inexpensive cap achieves a positive seal with a panel around the screw hole, assures an enhanced thread lock between the bore of the cap and the shank, provides particularly effective means for rapidly increasing and eventually limiting the screwing torque to a maximum allowable torque when the cap is screwed to its final tightened condition on the shank, and likewise assures a desired clamping force at said final condition, thereby to prevent damage to the threaded shank or parts secured thereto.

Other objects are to provide an improved cap of the foregoing type and method of using the same which renders the screw threads of all bolts essentially comparable in clamping effectiveness to class A threads when the bolts are manufactured within reasonable tolerances, thereby to effect a dependable relationship between the final tightening torque and the clamping force of the bolt and enabling a desired clamping force to be readily achieved merely by controlling the maximum allowable screwing torque.

Other objects are to provide such a cap that may be readily molded from an elastomeric polyurethane or comparable material preselected to provide a smooth unthreaded shank receiving bore adapted to receive the threaded shank with an interference fit and to screw thereon against the panel, whereby the elastomeric material of the cap deforms resiliently within its elastic limits into the shank threads to effect the screw action and at the predetermined maximum allowable torque merely flows within its elastic limits over the screw threads from one helical turn to the next to terminate the screw action without being cut or ruptured, and whereby the elastomeric material thereafter returns to its initial smooth-bore unthreaded condition for reuse as before in the event the cap is unscrewed from the shank.

Other objects are to provide such a cap and method of use whereby the torque required to screw the cap on the shank is determined by such factors as the stiffness, elasticity, friction, and the like, of the elastomeric material, the interference fit between the bore and shank, and the pitch and dimensions of the shank threads, which factors determine the force required to displace the polyurethane or comparable elastomeric material of the cap during the screw action; and whereby, as the cap is tightened against the panel and the axial or clamping force on the bolt shank increases, the cap material is resiliently stressed within its elastic limits by the clamping force and displaced axially along the screw threads of the bolt shank, thereby to elongate the portions of the cap adjacent the bolt threads and simultaneously to reduce the effective diameter of the bore of the cap. In consequence, as the cap is tightened to its final condition, the bore of the cap is constricted around the bolt shank to rapidly accelerate the screwing torque and the clamping or axial force on the bolt until the aforesaid predetermined maximum torque is attained and the elastomeric cap material flows over the screw threads without increasing the clamping force.

The screw-tightening torque must overcome the resilient reaction of the elastomeric cap material as it is displaced into the thread grooves of the shank. No such force is required to deform the elastomeric material during the unscrewing. In fact, the resiliency of the elastomer attempting to return to its undeformed condition aids the unscrewing. By suitably determining the above-noted factors that determine the maximum screw-tightening torque and clamping actions to be effected by the cap, the related and smaller unscrewing torque can also be essentially determined. Thus, a desired differential between the maximum tightening and loosening torque may be preselected such that the loosening torque may be any desired amount between 50% to 75%, for example, of the maximum tightening torque.

As a result of the structure described, a 35 to 40 in. lb. torque may be applied by a power to tighten the cap to its final condition. Because the resiliency of the elastomeric cap material displaced axially along the screw threads by the force required to tighten the cap exerts a major force attempting to unscrew the cap, a few additional inch-pounds of unscrewing torque will release the cap to return to its axially unstressed condition and thereby significantly reduce the binding action of the cap on the shank, enabling an ordinary man to unscrew the cap manually in the field by exerting, for example, merely 25 in. lbs. of torque. Such a facility is particularly desirable where the assembly secured to the panel by the screw shank and cap requires frequent replacement of parts, as for example a light bulb in an automobile taillight assembly. After a defective light bulb is replaced, the cap may be screwed on the shank manually to secure the taillight assembly to the panel temporarily until effective tools are available.

Also, by using a polyurethane elastomer for the cap, the "break-force" comprising the initial force required to loosen the cap from its final tightened position on the shank and against the panel may be maintained comparatively constant with time because the polyurethane does not harden or lose its elasticity appreciably with age. By virtue of the unthreaded bore, the same cap may be used with a limited range of different screw sizes and thread standards, as for example with both U.S. and metric threads.

Another and more specific object of the invention is to provide a protective cap as described above comprising an elastomeric polyurethane or comparable material having an annular abutment coaxial with the shank receiving bore at one axial end thereof. The annular abutment may comprise a thin flexible sealing lip having a comparatively small area for abutting the panel surface and flexing to conform to minor irregularities therein and to provide an effective seal around the bore when the cap is screwed to its final position on the shank. Where sealing is less important or less difficult, the area of the base or abutment surface may be comparatively large to affect an essentially positive movement limiting stop for the screw action at a predetermined axial relationship with respect to the panel.

In either situation, when the base surface of the cap engages the panel and exerts an axial deforming force against the annular abutment, the torque required to screw the cap toward the panel rapidly increases to the maximum allowable torque desired to be applied to the shank and predetermined as aforesaid by the characteristics of the cap and shank. Thereafter the axial screw induced advance of the cap ceases and its elastomeric material merely flows across the screw threads. If desired, a power actuated torque limiting wrench may be used to stop the screw action at a torque slightly less than the aforesaid maximum allowable torque exertable by the cap.

Still another and more specific object is to provide essentially a reversal of the parts described above wherein instead of screwing an elastomeric cap having a smooth cylindrical bore on a threaded shank, a circular cylindrical extension of an elastomeric member is screwed into an internally threaded bore or well, whereby essentially the same achievements as described above are obtained, including the maximum allowable screwing torque, the axial clamping force and radial thread-lock force as direct and reliable functions of the maximum screwing torque, regardless of typical dimensional variations between the parts and imperfections in the screw thread.

Other objects of this invention will appear in the following description and appended claims, reference being had to the accompanying drawings forming a part of this specification wherein like reference characters designate the corresponding parts in the several views.

THE PRIOR ART

The prior art is replete with fasteners and sealing devices. The following patents are representative of art relating to the present invention and known to applicant:

U.S. Pat. No. 2,878,905—Langermeser
U.S. Pat. No. 3,829,150—Moore
U.S. Pat. No. 3,933,076—Tanaka
U.S. Pat. No. 4,040,463—Petrus
U.S. Pat. No. 4,114,506—Aimar The above-noted patents provide a protective cover for a screw shank and disclose the concept of cutting threads into an unthreaded bore, as in Petrus, for example, but are otherwise unconcerned with the important concept, in an arrangement of parts and functions comprising the present invention, of resiliently displacing the elastomeric cap material into thread grooves without cutting.

Specifically, the prior art does not suggest applicant's cap of elastomeric material as described herein having the unthreaded shank receiving bore dimensioned with respect to a screw shank and such characteristic as the toughness and elasticity of the cap material to effect a predetermined interference fit between the shank and bore, whereby the cap material is resiliently displaced within its elastic limit into the thread grooves of the shank and axially of the bore to constrict the latter around the shank during the screw action and eventually to flow across the threads without being cut or permanently deformed when a maximum allowable torque is applied to the cap, such that the axial screw induced travel of the cap material ceases upon continued rotation of the cap, and the bore therein returns essentially to its initial smooth condition when the cap is unscrewed from the threaded shank, enabling the cap to be reused.

Likewise the prior art is not concerned with applicants approach to the problem of obtaining a dependable relationship between the screw-on torque and the clamping or axial force on the threaded shank, nor with applicant's approach to the problem of predetermining the differential between the maximum allowable screw-on torque and the screw-off torque, nor with the concept of resiliently displacing portions of the cap material axially of the unthreaded bore adjacent the screw shank as the cap is screwed to its final tightened condition on the shank, whereby the bore is constricted around the shank to enhance the binding force between the cap and shank, and whereby the resilient reaction force of the cap material facilitates unscrewing of the cap and thereby materially reduces the initial torque required to unscrew the cap as compared to the final allowable screw tightening torque.

Furthermore, the prior art is not concerned with applicant's concept of the annular abutment surface or sealing lip around the shank whereby engagement between the panel and annular abutment surface rapidly increases the screwing torque to the maximum limiting torque and thus stops the axial travel of the cap toward the panel when a predetermined axial relationship therebetween is obtained, thereby to assure the aforesaid seal at the limit of the screw action and to prevent the application of both an excessive axial force and screwing torque on the shank.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DETAILED DESCRIPTION OF THE PREFERRED EMBODIMENTS

Figure 1:
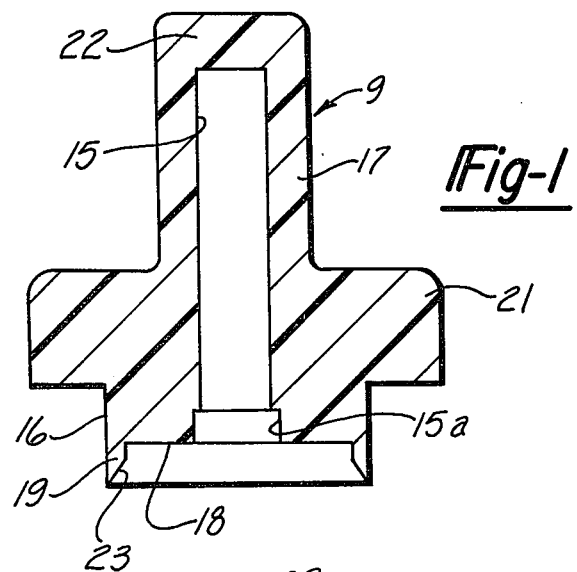
FIG. 1 is a view partially in axial mid-section and partially in elevation of a cap embodying the invention.
Figure 2:
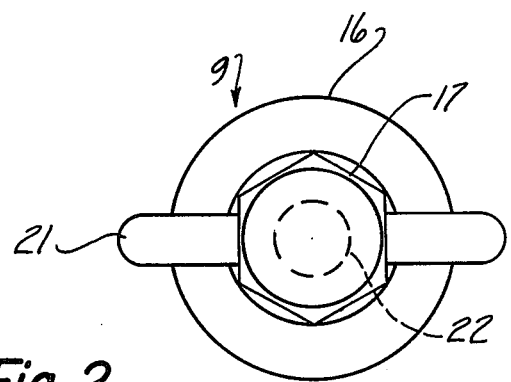
FIG. 2 is a plan view looking toward the hexagonal end of the cap of FIG. 1.
Figure 3:
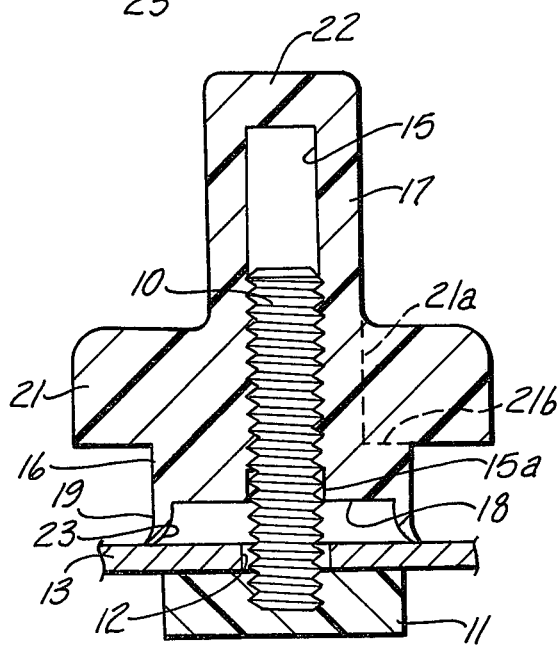
FIG. 3 is a sectional view similar to FIG. 1, but showing the cap screwed on a threaded shank.

Referring in particular to FIGS. 1-3, a unitary or one-piece molded wing-nut type of protective cap 9 is illustrated by way of example in association with the shank 10 of a screw or threaded stud having an outer end portion confined within a resin element 11, as for example by being molded therein as an insert. The element 11 may comprise part of any one of numerous devices, as for example part of a vehicle trim or an automobile taillight assembly from which the threaded stud 10 extends through an opening 12 provided therefore in a panel 13. The latter may comprise a body panel or a wall of the vehicle luggage compartment, for example, into which the shank 10 extends, such that it is desirable to provide means within the luggage compartment for securing the shank 10 in place, for preventing water leakage into the compartment via the opening 12 and along the screw threads of the shank 10, and also for protecting the hands of personnel against contact with edges of the shank 10.

The cap or wing-nut 9 discloses herein accomplishes the foregoing among other objectives and will now be described in detail. At the outset it comprises a resiliently deformable elastomeric material having a smooth unthreaded cylindrical bore 15 dimensioned to receive the shank 10 in screw relationship with a predetermined interference fit. The elastomeric material of the cap 9 has sufficient resistance to shearing and is sufficiently yieldable or deformable resiliently that it flows within its elastic limits into the thread grooves of the shank 10 without being cut or ruptured or permanently threaded when screwed thereon and returns to its smooth unthreaded condition after being unscrewed. A polyether type polyurethane has been employed for the cap 9 because of its stability even after long exposure to moisture. Where such a characteristic is not important, other polyurethanes or comparable elastomers having known characteristics capable of performing the functions described herein may be used. The polyurethanes in particular may be readily molded to provide the cap 9 and are characterized by comparatively low coefficients of friction, do not harden appreciably with age, and combine the toughness and elasticity that enable them to be screwed on the shank 10 as described herein without cutting threads into the smooth cylindrical wall of the bore 15.

Coaxially with the bore 15, the cap 9 comprises a lower annular neck 16 at one axial end, an elongated wall member 17 adjacent the opposite axial end and having an exterior hexoganol surface adapted for engagement by a wrench, an end surface 18 normal to the axis of the bore 15 at the base of the neck 16, and an annular abutment or knife edge sealing lip 19 extending axially beyond the surface 18 from the outer cylindrical periphery of the neck 16.

The cap 9 also provides a pair of diametrically extending wings 21, spaced from the surface 18 by the neck 16 to facilitate finger engagement for manual operation, and a closure 22 for closing and sealing the axial end of the bore 15 opposite the surface 18. Each wing 21 extends radially outward from its radially inner edge 21a and axially upward from its axially lower edge 21b. The edge 21a extends axially along and integrally with the outer surface of the wall member 17 and the edge 21b extends radially along and integrally with the axially upper surface of the neck 16.

The cylindrical bore 15 extends axially within the cap 9 from the closure 22 and opens through the surface 18 to receive the stud 10 and is dimensioned to provide a radial interference, amounting in a typical situation to between approximately five and fifteen thousandths of an inch, with the outer radius of the stud threads. It is apparent that the dimension of the interference will depend to some extent on the radius of the stud 10 and the pitch of its threads and also upon the torque desired for screwing the cap 9 on the shank 10. Ordinarily the interference will increase as the radius of the shank 10 and the coarseness of its threads increase. The torque required to screw the cap 9 on shank 10 prior to engagement with the panel 13 will be determined by the interference between the shank 10 and bore 15 and the stiffness of the aforesaid elastomeric material of the cap. Such torque will vary considerably, depending upon the requirements of the specific application, but the cap 9 described herein enables attainment of any reasonably desired torque.

In a typical situation, the cap 9 may be screwed on the shank 10 by a power operated wrench engaged with the hexagonal portion 17. The lower end 15a of the bore 15 may be enlarged to eliminate interference with the shank 10 and to facilitate its insertion into the bore 15. Initially the cap 9 will be pressed coaxially against the exposed end of the shank 10 and rotated by the wrench in the direction to advance along the screw threads. The elastomeric material of the cap 9 will deform resiliently into the screw threads as the cap advances and moves axially along the shank 10 toward the panel 13. Accordingly, after an initial turn or two, axial pressure on the nut 9 from the wrench will not be required.

The annular sealing lip 19 will first engage the panel 13 and aided by an axially endwise diverging inner conical cam surface 23 of the lip 19, will be resiliently deformed within its elastic limits axially inwardly or upwardly and radially outwardly with respect to the cap 9 into fluid sealing engagement with the panel 13. To this end, the elastomeric material of the cap 9 is sufficiently soft so that the lower knife edged abutment surface of the lip 19 will conform resiliently to minor irregularities in the confronting surface of the panel 13 and effect the desired fluid seal entirely around the bore 15 when the cap is finally tightened against the panel 13.

The resistance of the lip 19 to distortion as the cap 9 is screwed to its final position rapidly increases the torque required to effect the screw action, such that the maximum limiting torque which the elastomeric material of the cap can withstand without yielding resiliently across the screw threads is rapidly attained. Thereafter if the screwing torque is continued, the cap 19 will merely rotate on the shank 10 at a constant torque without advancing axially and without permanently deforming or cutting the material of the cap, as aforesaid. If a power operated torque wrench is employed, it may be set to slip and stop rotation of the cap at a torque slightly below the aforesaid maximum allowable torque. In any event, the hardness and elasticity of the material of the cap and the aforesaid interference fit will be predetermined so that the cap itself will be torque limiting and prevent damage to the shank 10 or element 11 in the event a torque limiting wrench is not used.

Figure 6:
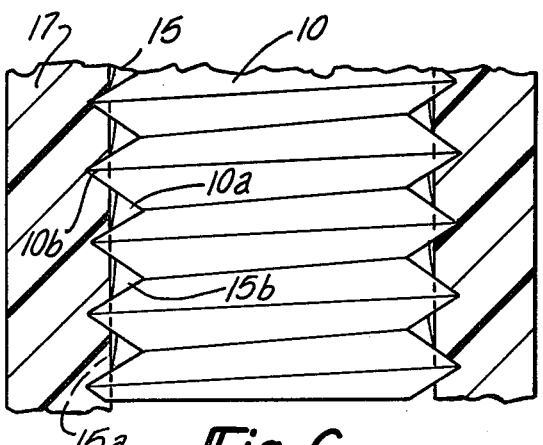
FIG. 6 is a fragmentary enlarged section similar to FIG. 3, illustrating the relationship between the elastomeric cap material and the screw threads during the screw-on action, but prior to engagement between the cap and panel.
Figure 7:
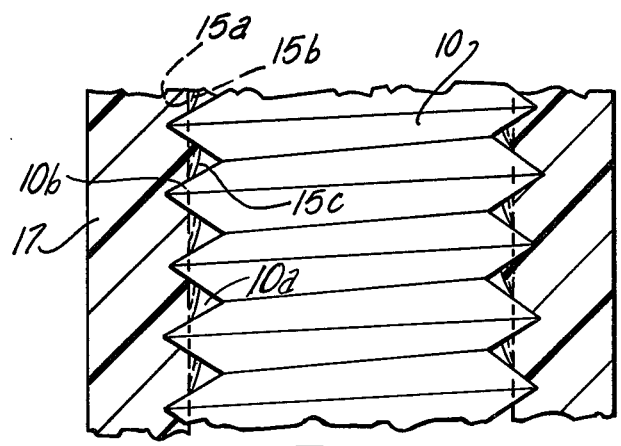
FIG. 7 is a view similar to FIG. 6, illustrating the same relationship at the condition of maximum allowable torque after the cap has engaged the panel.

It will be apparent to those familiar with the art relating to elastomers that the elastomeric material described herein must have a comparatively high resistance to tearing and shearing, a comparatively high resilience and tensile strength, and comparatively low coefficients of friction, fatigue, elongation set, and compression set in order to effect the desired resistance to displacement into the thread grooves 10a and resilient reaction against the screw threads 10b at the final tightened condition, FIGS. 6 and 7, and also to effect the desired axial clamping force on the shank 10 and resistance to the screwing torque required to maintain the maximum allowable torque when the cap material flows relatively axially across the helical screw threads to terminate the screw action upon continued rotation of the cap at the final tightened condition, all without rupturing or permanently deforming the cap material, whereby the cap material will readily return essentially to its initial undeformed condition if the cap is unscrewed from the shank.

Except for the generalized physical characteristics noted above, the elastomeric cap material may comprise a wide range of elastomers wherein the specific physical characteristics, together with the dimensional characteristics of the screw 10 and the interference fit between the latter and bore 15, will be determined in accordance with the resulting torque and clamping forces desired. A specific example of a screw shank 10 used successfully with the present invention comprises a threaded steel stud extending 23.5 mm above the upper surface of panel 13 and having an outer diameter of 6.3 mm, a coarse thread amounting to 1.81 mm per 360° helical turn, and a thread groove 0.5 mm in depth.

The characteristics of typical polyurethanes used with the shank 10 comprise a durometer hardness ranging between approximately 62 to 68 shore D, measured by ASTM (American Society for Testing Materials) test D2240; an ultimate tensile strength per ASTM test D412 Die C ranging between approximately 30 MPa and 40 MPa (Mega Pascals); a 100% tensile modulus ranging between approximately 18 MPa and 28 MPa; an ultimate elongation ranging between approximately 350% and 500%; a tensile set at 50% elongation of approximately 7.5% per ASTM test D412; a compression load of approximately 200 psi at 5% deflection, which load can feasibly range between approximately 100 psi and 300 psi, and approximately 2600 psi at 25% deflection, which load can feasibly range between approximately 1500 psi and 3500 psi per ASTM test D1594; a compression set after 22 hours at 70° C. of approximately 39% per ASTM test D395B; a stiffness of approximately 224 MPa but which can feasibly range between approximately 150 and 300 MPa per ASTM test D747; a resilience of approximately 40% per ASTM Bayshore test D3632, but which can feasibly range at least between 35% and 45%; and a tear strength on the order of magnitude of approximately 140 kN/m (kilo Newtons per meter) per ASTM test D624, which can feasibly range between approximately 120 and 200 kN/m.

The above noted physical characteristics are for polyurethanes that perform satisfactorily with a cap 9 having a bore 15 that provided approximately five thousandths of an inch radical interference with the screw thread 10b of the above specified threaded shank 10. However, the values for the above noted characteristics are not critical and may vary considerably depending upon the requirements of a specific application. For example, the hardness can feasibly range at least between 35 shore D and 70 shore D. The harder the polyurethane, the less will be the necessary displacement or deformation in order to obtain a desired maximum allowable torque and desired axial clamping force on the shank 10, and the more readily will the polyurethane return to its undeformed condition. The ultimate tensile strength at break can feasibly be as low as 5 MPa. The tensile modulus can feasibly range between at least 2 and 30 MPa for 100% elongation; the ultimate elongation can be as low as 200%; the compression load can range between approximately 50 psi and 4000 psi at 5% deflection and between approximately 500 psi and 10,000 psi at 25% deflection; the stiffness may range widely from 5 MPa to 800 MPa; the resilience can range between approximately 10% and 60%; and the tear strength may be as low as 50 kN/m. Also obviously, a nominal compression set, tensile set, and fatigue coefficient are preferred, but compromises with other desirable characteristics are usually necessary. The foregoing values, of course, are determined in accordance with the corresponding test procedures noted above.

The present invention is explained in more detail with reference to the schematic FIGS. 6 and 7 which are for illustration only and are not intended to be to scale. FIG. 6 shows the relation between the bore 15 and the shank 10 while the cap 9 is being screwed thereon and before the abutment lip 19 engages the panel 13. The dotted line 15a indicates the normal position of the undeformed smoothbore 15 before the cap 9 is screwed on the shank 10. At the FIG. 6 condition, a portion of the cap material defining the bore 15 is displaced into the thread groove 10a of the helical screw thread 10b, as indicated by the cap material 15b to the right of line 15a.

The screwing torque is determined essentially by such factors as: (a) the resistance of the cap material to deformation or displacement, which in turn is determined by the above mentioned physical characteristics that determine the hardness or stiffness and elasticity of the cap material, the interference fit between the screw thread 10b and bore 15, and such dimensions as the pitch and depth of the screw thread 10b; (b) the resilient reaction of the deformed cap material tending to return to its undeformed condition; and (c) friction, especially friction between the cap and screw shank. When the cap 9 is not being rotated, the cap material 15b resiliently displaced into the thread groove, FIG. 6, will adjust to an equilibrium condition and exert an upward or unscrewing force in consequence of factor (b) above. By suitably determining the pitch of the thread 10b, the leverage afforded to the upward or unscrewing force to effect unscrewing can be rendered nominal and insufficient to overcome the frictional force holding the cap in place.

The screw-on torque will always be somewhat larger than the screw-off torque because the force required to overcome factor (a) above does not exist during the screw-off or unscrewing operation. The latter operation will also be assisted by the aforesaid upward unscrewing force resulting from factor (b) above. By suitably predetermining the controllable factors (a), (b) and (c) above, any reasonably desirable differential between the screw-on and screw-off torque may be readily obtained, such that the screw-off torque may be, for example, only 60% of the maximum allowable screw-on torque.

By virtue of the typically small coefficient of friction of the polyurethane specified herein and its yieldability that enables it to readily flow around burrs or surface irregularities in the screw thread 10b without being cut, the torque required to screw the cap 9 on an imperfect or low quality shank 10 will not be significantly different from the torque required to screw the cap 9 on a shank 10 having a class A thread. Thus all typically mass-produced screw threads are rendered as useful as class A threads. By means of the cap described, the non-controllable factors are rendered nominal, the screwing torque will be essentially the same for all threaded shanks of the same dimensions, whether class A or not, and, as explained more fully below in regard to FIG. 7, a predeterminable and reliable relationship is obtained between the maximum allowable screwing torque and the axial clamping force on the shank 10.

FIG. 7 illustrates the condition of the elastomeric cap material 15c adjacent the bore 15 after the cap 9 has been tightened against the panel 13 by the maximum allowable screwing torque. The latter torque, as described herein, is predetermined by the dimensions of the threaded shank 10 with respect to the bore 15 and by the physical qualities of the cap material that enable it to flow or to be displaced axially across the helical turns of the screw thread 10b when the desired maximum allowable torque is reached. When the annular abutment surface of the lip 19 engages the panel 13, the elastomeric material of the lip 19 is compressed axially to resist downward screw induced movement of the cap with increasing force.

As the downward axial movement of the cap 9 is resisted, the portion of the cap material 15c defining the bore 15 and engaged by the screw thread 10b is stretched resiliently and forced downwardly by the screw thread 10b into the helical thread groove 10a, thereby reducing the effective internal diameter of the bore 15. In consequence, not only is the screwing torque rapidly increased to the maximum allowable limiting torque, but the thread-lock between the shank 10 and the constricted bore 15 is materially increased. A resiliently induced clamping action against opposite sides of the panel 13 by the lip 19 and the element 11 is also effected by the spring reaction of the elastomeric cap material 15c directed axially upward against the thread of the shank 10. The axial clamping force exerted on the shank 10 as a result of the resilient reaction of the displaced cap material 15c directed upwardly against the thread groove 10b is of course a direct function of the maximum allowable screwing torque and as described above is essentially independent of uncontrollable defects in the shank 10 or screw thread 10b. Accordingly, the present invention achieves a dependable relationship between the screwing torque and the clamping force and enables the latter to be readily determined by the maximum allowable screwing torque.

The shock or vibration absorbing character of the polyurethane or comparable elastomer of the cap 9 enables the tightened cap 9 to retain its thread locking condition throughout normally to be expected vibrations, as for example vibrations resulting from driving an automobile over rough roads. The reaction force of the resiliently displaced cap material 15c against the screw thread 10b exerts a predetermined unscrewing force by reason of the pitch of the screw thread. By suitably determining the thread pitch and the reaction force of the displaced cap material 15c, the unscrewing force is readily predetermined. Thus, if desired, only an additional five or six inch-lbs. of unscrewing torque will be required to initiate unscrewing of the cap. A fraction of a turn will usually be adequate to release the stressed and displaced cap material 15c to return to the FIG. 6 condition, whereupon the cap 9 may be unscrewed manually from the shank 10 as described above.

Figure 5:
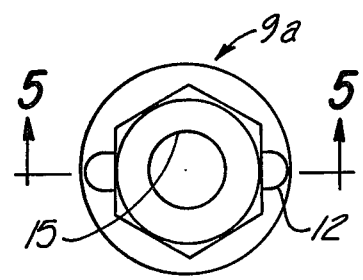
FIG. 5 is a plan view of FIG. 4.
Figure 4:
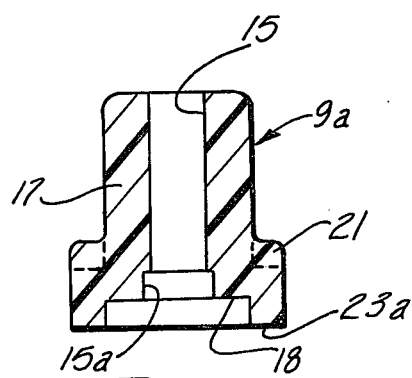
FIG. 4 is a view similar to FIG. 1, showing a modification.

As illustrated in FIGS. 4 and 5, the abutment 19 need not be a knife edged sealing lip, especially where the sealing is not required. Likewise where fluid leakage along the thread grooves of the shank 10 is not a problem, the upper end closure 22 for the bore 15 is not required. In the latter regard, the elastomeric material of the cap 9a flowing into the thread groove of the shank 10 will usually effect a high resistance leakage path, especially within an elongated wall member 17 of appreciable length.

The cap 9a of FIGS. 4 and 5 is similar in construction and operation to the cap 9 and differs primarily in dimensions. The annular abutment has a comparatively broad area base or abutment surface 23a adapted to confront and abut the panel 13. The surface 23a is usually less effective as a seal than the knife edged abutment 19, but is more effective in transmitting axial force upon engagement with the panel 13. Accordingly, the screwing torque reaches the maximum allowable limit almost immediately after said engagement and stops the screw induced axial travel of the cap 9a more precisely at a predetermined axial relationship between the cap 9a and panel 13, as compared to the more flexible feathered edge 23. In other respects the elastomeric material of the cap 9a defining its bore 15 is resiliently stretched axially along the shank 10 to restrict the latter bore 15 and effect the clamping force and enhanced thread-lock against the shank 10 at the maximum limiting torque as described in regard to FIG. 3.

Figure 8:
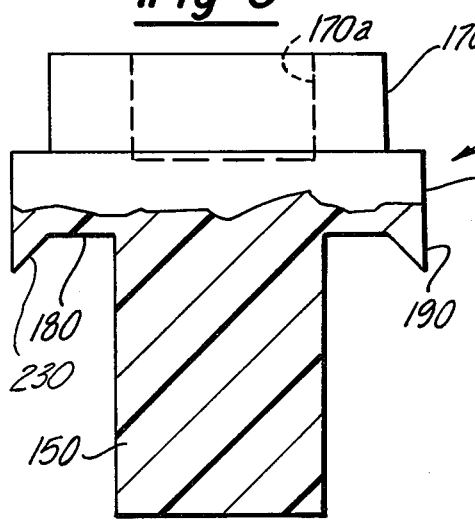
FIG. 8 is a view similar to FIG. 1, showing a modification comprising a reversal of parts.

FIG. 8 illustrates an embodiment of the invention wherein an integral or unitary molded elastomeric member 90 is formed with a smooth cylindrical extension 150 of circular cross section adapted to be screwed into an internally threaded bore or well 100 with an interference fit comparable to the interference fit described in regard to FIG. 3. The extension 150 depends axially from an annular body 160 of the member 90. A wrench receiving head 170 having an exterior square or hexagonal cross section or an upwardly opening wrench receiving recess 170a of square or hexagonal cross section, or both the head 170 and recess 170a, extend coaxially upwardly from the body 160. A flat annular surface 180 defines the base of the body 160 normal to the longitudinal axis of the extension 150, and an annular knife edged sealing lip 190 comparable to the lip 19 depends from adjacent the outer periphery of the body 160.

The member 90 is formed symetrically with respect to the longitudinal axis of the extension 150 and parts comparable in function to corresponding parts in FIG. 1 are identified by corresponding reference numerals, multiplied by 10. The factors determining the elastomeric material of the member 90 and the various dimensional relationships between the extension 150 and screw thread 100b of the internally threaded well 100 are also essentially as described above in regard to FIGS. 1–3. The extension 150 may be screwed into the internally threaded well 100, FIG. 9, to clamp a panel 130 against a platform 110 of well 100 and to effect a seal around the internally threaded portion by engagement between the annular lip 190 and element 130.

The elastomeric material of the cylindrical extension 150 is displaced resiliently into the thread groove 100a by the screw action without being cut or permanently deformed. As the lip 190 is resiliently deformed into sealing engagement with panel 130, the elastomeric material 150c of the extension 150 is pulled resiliently downwardly by the helical screw thread 100b and forced resiliently into the thread groove 100a with increasing force as the screwing torque increases to a maximum allowable limiting value whereat the elastomeric material 150c yields resiliently within its elastic limit and flows relatively axially across the screw thread 100b, also without being ruptured or permanently deformed, to terminate the screw action regardless of continued rotation of the member 90.

Figure 9:
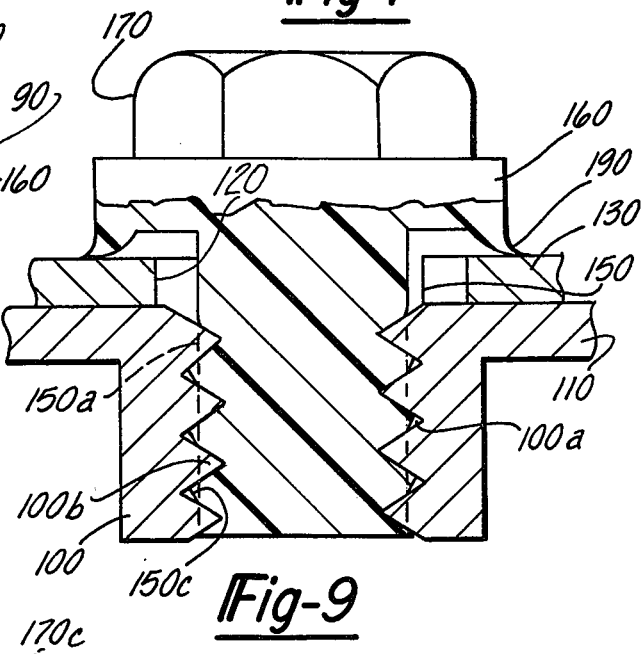
FIG. 9 is an enlarged view similar to FIG. 3, showing the elastomeric member of FIG. 8 in a clamping action.

Similarly to the above described reaction regarding FIG. 3, the reaction force of the resiliently displaced elastomeric material 150c directed axially against the helical thread 100b determines the clamping force as a direct function of the maximum allowable screwing torque. The primary difference regarding FIG. 9 is that the elastomeric material 150c is forced (from the undeformed condition indicated by the dotted line 150a) radially outwardly against the internally threaded bore to effect the positive thread lock, whereas in FIGS. 3 and 7 the elastomeric material 15c is forced radially inwardly against the shank 10. The resulting thread-lock in each situation is essentially the same.

Figure 10:
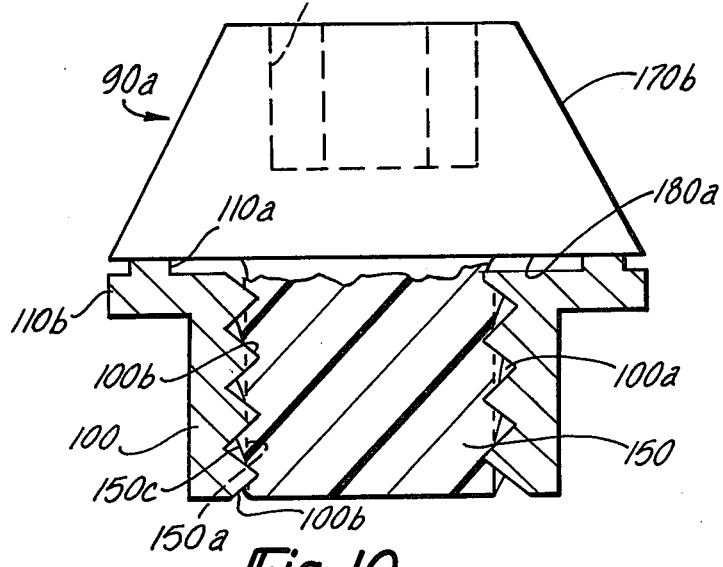
FIG. 10 is a view similar to FIG. 9, showing another modification.

FIG. 10 illustrates a modification that operates in the manner of the FIG. 9 modification, except that the member 90a is used as a plug for an internally threaded well 100. extension 150 depends coaxially from a conical head 170b having means such as an upwardly opening kerf or slot 170c engageable by a tool for effecting the screw action. The annular base 180a of the head 170b comprises a plane surface normal to the longitudinal axis of the extension 150 and adapted to seat in fluid sealing contact at an annular boss 110a raised coaxially with respect to the internally threaded well 100 from an annular platform 110b around the upper end of the well 100.

When the base 180a engages the boss 110a, the screwing torque rapidly increases to the maximum limiting value and the elastomeric material 150c is pulled resiliently into the thread groove 100a by the helical screw thread 100b to clamp the base 180a against the boss 110a with a force comprising a direct function of the maximum allowable screwing torque, and also to effect the positive thread-lock between the displaced elastomeric material 150c and the internally threaded well 100, as described above. Likewise upon continued rotation of the member 90a at the maximum allowable torque, the elastomeric material 150c flows across the screw thread 100b without being ruptured or permanently deformed and returns to its unstressed smooth cylindrical condition indicated by the dotted line 150a when unscrewed from the well 100, also as described above. Unscrewing of either member 90 or 90a is initially facilitated by the resilient reaction force of the stressed material 150c against the screw thread 100b. Thereafter the unscrewing torque will be a function of the screw-on torque predetermined by the characteristics of the elastomer and the relative dimensions of the screw thread and extension 150, essentially as described above in regard to FIGS. 3 and 7. The member 90a finds use in numerous applications requiring a readily replaceable plug or bumper or cleat, as for example a replaceable cleat for various types of athletic shoes.

I claim:

1. A reusable self torque limiting elastomeric unthreaded member and threaded member type clamping combination having a preselectable screw-induced torque maximum beyond which continued screw-on rotation of said members produces no additional axial relative movement between said members, said combination comprising a screw-threaded member and an unthreaded member, said unthreaded member comprising a cylindrical screw-thread engaging member of an elastomeric material resiliently deformable without permanent thread formation in said unthreaded member by selectable interference fit engagement between said unthreaded member and the peripheral portions of the thread of said threaded member as screw-on relative rotation of said members produces screw-induced torque forces and axial travel of said members toward each other, said unthreaded elastomeric member having abutment means for engaging a part to be clamped and for supplying selectable resistance force to the relative axial movement of said members during said screw-induced axial travel, said resistance forces and said torque forces combining to provide a limit to said screw-induced axial travel, and for achieving preselected radical thread-lock and axial clamping forces at said limit of said screw-induced travel sufficient to maintain said clamping combination of said members in clamping relationship to a member to be clamped.

2. A clamping combination in accordance with claim 1 wherein said threaded member is a metal bolt.

3. A clamping combination in accordance with claim 1 wherein said unthreaded member is a polyurethane material capable of maintaining said preselected radial thread-lock and axial clamping forces.

4. The combination according to claim 1, wherein said threaded member comprises an internally screw threaded well, said cylindrical screw thread engaging member has a smooth unthreaded exterior cylindrical surface dimensioned to screw into said well with said interference fit and to effect said flow and deformation into the thread groove of said well.

5. The combination according to claim 1, said elastomeric material having the physical characteristics equivalent to a polyurethane having a durometer hardness between 62 and 68 Shore D, measured by ASTM (American Society for Testing Materials) test D2240, a 100% tensile modulus between 18 and 28 megaPascals, an ultimate elongation between 350% and 500% a compression set after 22 hours at 70° C. of less than 39% per ASTM test D395B, and a tear strength greater than 120 kiloNewtons per meter per ASTM test D624.

6. The combination according to claim 5, said elastomeric material also having the physical characteristics to enable unscrewing of said members from said final clamping condition by means of an unscrewing torque in the range between about 50 to 75 percent of said maximum allowable torque.

7. The combination according to claim 5, said interference fit comprising at least 0.005 inches radial interference between the cylindrical surface of said unthreaded member and the proximate portions of said screw thread.

8. The combination according to claim 1, said threaded member comprising a shank having said screw thread externally thereon, said unthreaded member comprising a wall member having a smooth unthreaded bore adapted for said screw engagement with the screw threads of said shank at said interference fit, said abutment means comprising an annular lip of said unthreaded member around said bore at one axial end thereof and extending axially endwise beyond said one axial end.

9. The combination according to claim 8, said lip comprising a sealing lip of elastomeric material engageable with a part to be clamped around said shank in fluid sealing relation at said final clamping condition.

10. The combination according to claim 1, said threaded member comprising an externally threaded shaft, said cylindrical screw-thread engaging member having an unthreaded cylindrical bore dimensioned to screw on said shaft with said interference fit and to effect said flow and deformation into the thread groove of the shaft.

11. The combination according to claim 10, said abutment means comprising an annular sealing lip of elastomeric material around said bore adjacent to one axial end thereof and extending axially endwise beyond said one end.

12. The combination according to claim 10, said threaded member comprising a stud threaded throughout its length, and means comprising a molded resin support molded around and bonded to a threaded end portion of said stud.

13. A clamping combination according to claim 1, said cylindrical screw thread engaging member having a smooth unthreaded exterior cylindrical surface for screwing into an internally screw threaded well of said threaded member.

14. A clamping combination according to claim 13, said abutment means comprising an annular portion of said unthreaded member around said cylindrical surface adjacent to one axial end thereof and having a plane abutment surface facing toward the opposite axial end of said cylindrical surface.

15. A clamping combination according to claim 14, said unthreaded member comprising a replaceable cleat for a shoe, a ground engaging portion of said cleat extending axially from said abutment means in the axial direction from said opposite axial end toward said one axial end.

* * * * *